UNITED STATES PATENT OFFICE.

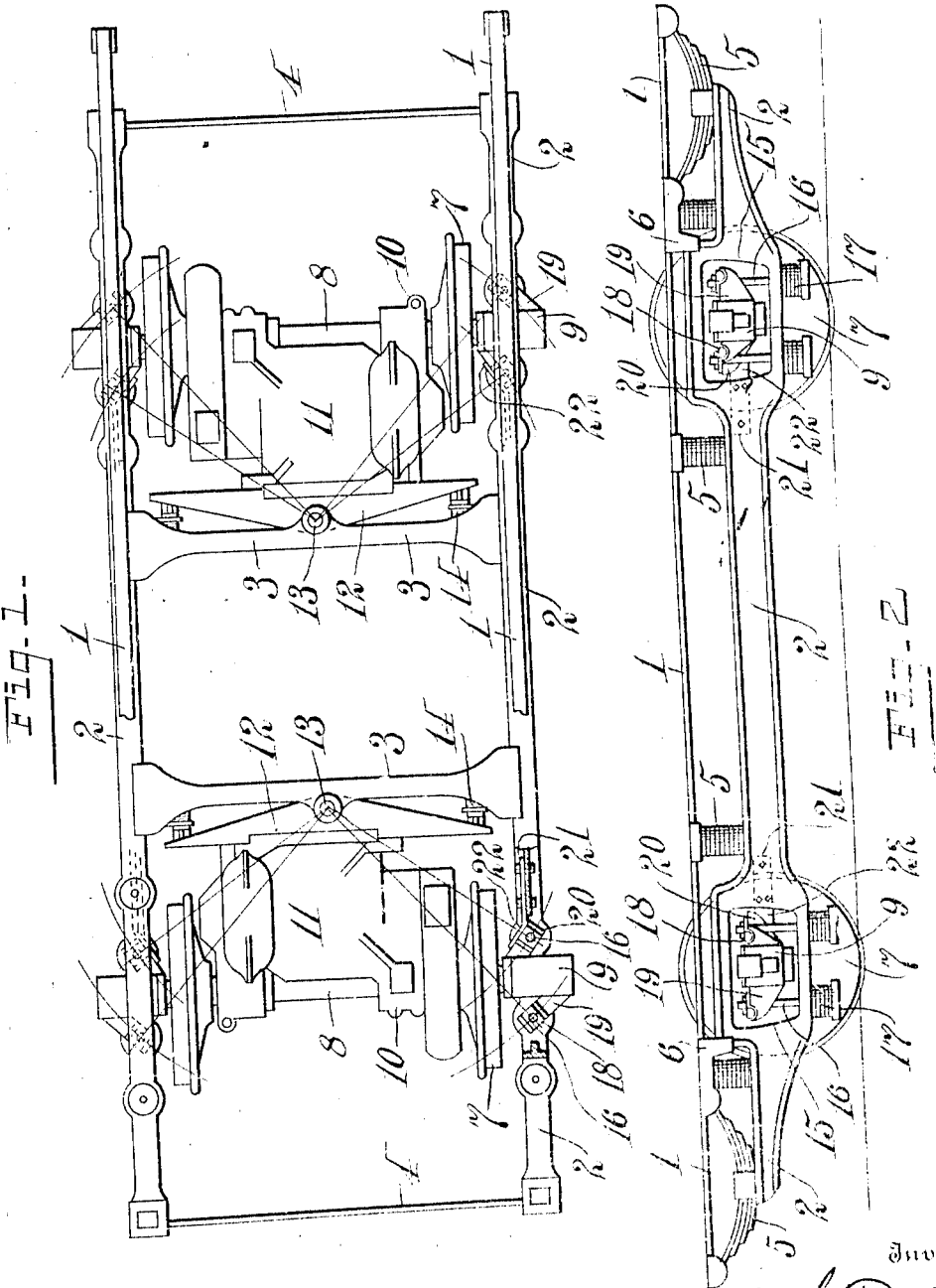

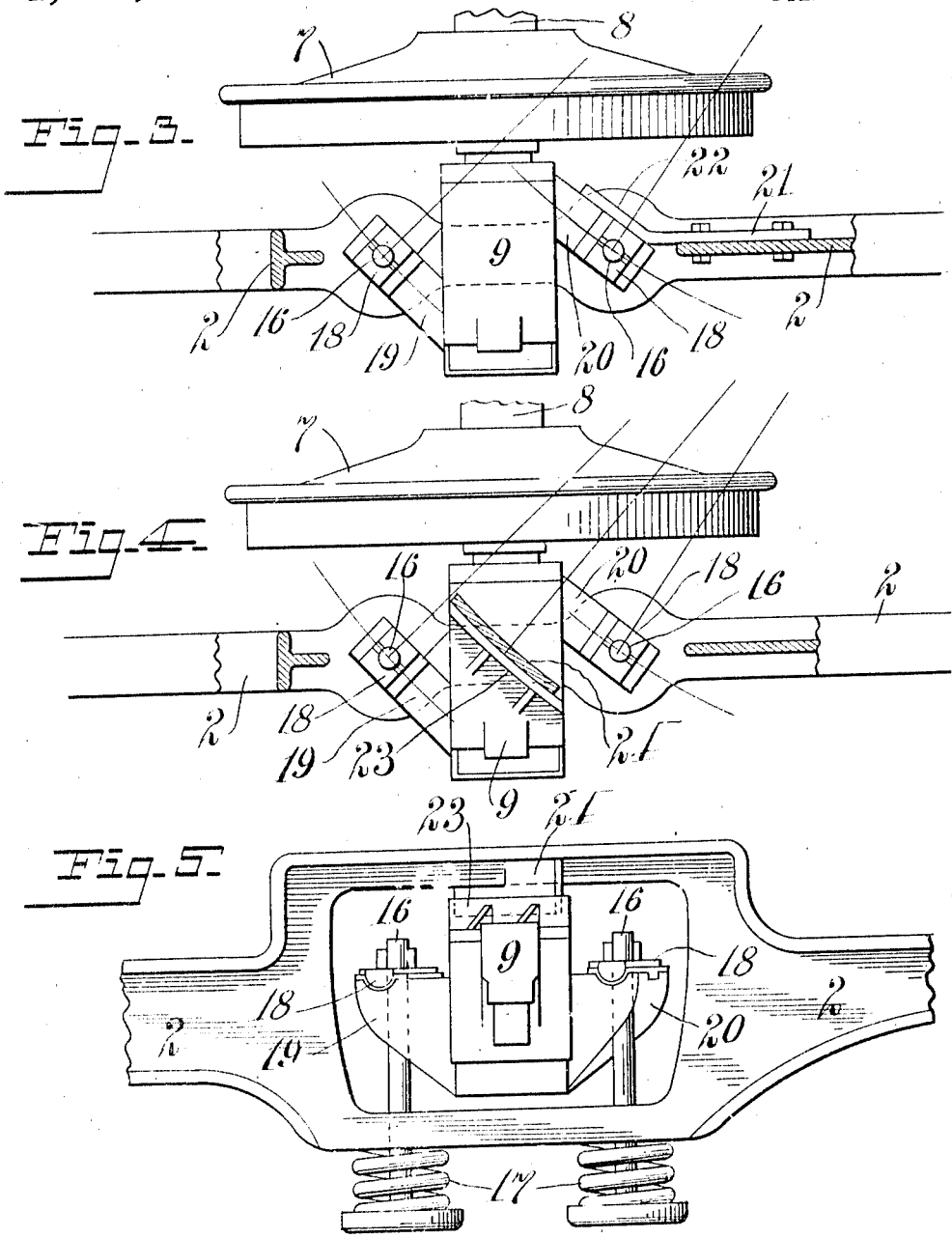

GEORGE C. TOWLE, OF DAYTON, OHIO.

CAR-TRUCK.

1,061,146.  Specification of Letters Patent.  Patented May 6, 1913.

Application filed July 20, 1912. Serial No. 710,532.

*To all whom it may concern:*

Be it known that I, GEORGE C. TOWLE, a citizen of the United States, residing at Dayton, in the county of Montgomery and State of Ohio, have invented certain new and useful Improvements in Car-Trucks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in non-parallel axle car trucks.

The object of the invention is to provide means for preventing lateral movement of the car-body when the car is in motion.

Referring to the accompanying drawings, Figure 1 is a top plan view of a non-parallel axle car truck provided with my improvements. Fig. 2 is a side elevation of the same. Fig. 3 is a top plan view of one of the journal boxes with parts shown in section. Fig. 4 is a similar view showing a modified construction; and Fig. 5 is a side elevation of the same.

Throughout the specification and drawings, similar reference characters indicate corresponding parts.

Referring more particularly to the drawings, the truck consists of the following members: 1—1 represents two longitudinal side plates upon which a car (not shown) is mounted. Mounted below the plates 1 are side members 2 connected by intermediate cross members 3 and end cross members 4 and which form the main frame of the truck. The plate 1 and the members 2 are connected by the usual springs 5 of a car truck, and guides 6 are provided to maintain the car and truck in alinement during the vertical swaying movement of the car. The truck is provided with the usual wheels 7 mounted on axles 8 provided with journal boxes 9. To permit the axles to assume non-parallel positions when the truck is rounding a curve and to thus enable the wheel base of the truck to be made of greater length, the wheels 7 are pivotally connected to the truck frame as follows: Mounted on the axles 8 are motor journal bearings 10 which extend from motors 11. The motors 11 are attached to members 12 pivoted at 13 to the cross members 3. The journal boxes 9 lie in openings 15 in the side members 2 and are connected to the said members 2 by bolts or rods 16 through springs 17. This construction permits the journal boxes to have a lateral movement relative to the main frame of the truck, and provides for a flexible connection between the wheels and the main frame. The jars received by the wheels when meeting obstructions or passing an uneven track are, therefore, not transmitted to the main frame and car. The upper ends of the said rods 16 are attached to pivotal members 18 having bearings in projections 19 and 20 extending from the sides of the journal boxes. The axes of the pivotal members 18 are radial with the pivots 13 to permit the subframes, consisting of the members 12 and the motors 11, the axles 8, the wheels 7 and the journal boxes 9, to swing around the pivots 13. While in the present case, the connection between the journal boxes 9 and the pivots 13 are through the moving parts 8 of the sub-frame, it is to be understood that such connection may be made by a rigid member in any well known manner. When the truck is rounding a curve, the pressure of the rails on the flanges of the wheels will swing the axles 8 on the pivots 13 to positions approximately radial with the curvature of the track. When the car is running on a straight stretch of track, the axles 8 are maintained in parallel positions by springs 14 which lie between the members 12 and the intermediate cross members 3.

In trucks of this type, it has been found that the car body and the main truck frame is subject to considerable lateral movement relative to the wheels and axles when the car is in motion. This movement is permitted by the swinging connections 16 between the side frames and the journal boxes, the lost motion between the journal boxes and axle, and the pivot 13. As before stated, trucks of this type may be made with a long wheel base and are adapted to support car bodies of great length and weight, features required in the more modern construction of street cars. The lateral movement of the ends of the car body will be very considerable which is due to the length and weight thereof. The ends of the car body overhang the trucks to a considerable extent. This may result in serious consequences. Under these conditions, the cars are liable to collide when moving in opposite directions on double tracks, and the wheels are liable to leave the track when they strike imperfections in the rails, or obstructions on the track. To obviate the lateral movement of the car body and to thus obviate this element of danger, the following devices are provided.

Mounted on the inner sides of the side members 2 and adjacent to each of the journal boxes 9 are plates 21 provided with angle or guide portions 22 adapted to engage the inner faces of the projections 20 which extend from the journal boxes. The angle or guide portions 22 are disposed approximately tangential to circles having the pivots 13 as centers as indicated in Fig. 1. The projections 22 permit the sub-frames to move circumferentially to the pivots 13 but prevent said sub-frame moving laterally or at approximately right angles to the truck. These said guide portions 22 are instrumental in eliminating the lateral movement of the car body and permit the wheels 7 to move only circumferentially to the pivots 13 relative to the car.

In Figs. 4 and 5 is shown a modified construction of guide for the sub-frame. In this construction, the journal boxes 9 are provided with ribs 23 which are engaged by ribs 24 attached to or which may form an integral part of the side members 2 at the top of the openings 15. The ribs 23 and 24 lie circumferentially to the pivots 13 and perform the same function as the guides 22 and substantially in the same way. The guides, consisting of the members 22 and the ribs 23 and 24 are such that the vertical movement of the journal boxes, relative to the main frame, is not interfered with. Therefore, a truck as thus constructed, possesses easy riding qualities.

Without limiting myself to the precise arrangement shown and described, I claim, In a car truck, the combination with the main frame thereof, of sub-frames including journal boxes pivoted to said main frame, flexible connections between the main frame and the journal boxes whereby said journal boxes may have vertical movement relative to the main frame, and guides mounted on said main frame and engaging said journal boxes and adapted to prevent lateral movement of said main frame relative to the sub-frame.

In testimony whereof I affix my signature, in presence of two witnesses.

GEORGE C. TOWLE.

Witnesses:
M. GALLOWAY,
MATTHEW SIEBLER.